July 24, 1923.

J. VRBA

PIPE OR CABLE CLAMP

Filed July 5, 1921

1,462,671

Witnesses:
W. F. Kilroy
Harry R. White

Inventor
John Vrba
By Niel & Niel
Attys.

Patented July 24, 1923.

1,462,671

UNITED STATES PATENT OFFICE.

JOHN VRBA, OF CHICAGO, ILLINOIS.

PIPE OR CABLE CLAMP.

Application filed July 5, 1921. Serial No. 482,637.

*To all whom it may concern:*

Be it known that I, JOHN VRBA, a citizen of the United States, residing at Chicago, in the county of Cook and State of Illinois, have invented certain new and useful Improvements in a Pipe or Cable Clamp, of which the following is a description.

My invention relates to improvements in a pipe or cable clamp, and the primary object of my invention is to provide a simple, durable and inexpensive clamp that may be advantageously used for holding a pipe or other member relatively to a wall, ceiling or other support.

One of the objects of my invention is to provide a pipe hanger as above described which shall have auxiliary means thereon engageable with the material of the member from which it is supported to prevent the accidental turning of the hanger about its supporting means.

Another object of my invention is to provide pipe hangers that may be easily and quickly stamped from sheet metal and bent into proper form.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

In the drawings, wherein like reference characters indicate like or corresponding parts, Fig. 1 is a front elevation of my hanger in place upon a supporting member;

Figure 1:
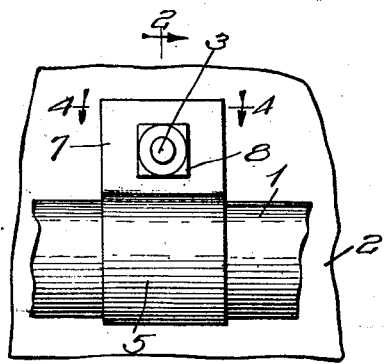

In the drawings, wherein I have shown the preferred embodiment of my invention, a pipe or cable 1 is to be hung from a supporting wall 2, said wall 2 being of any kind of material, and may be either a side wall, a ceiling or any other support. The hanger for supporting said pipe comprises a strip of sheet metal bent upon itself to form a loop 5 and a pair of resilient legs 4 and 7, said loop being tangential to the leg 4 and joining the leg 7, said leg 7 being bent at an angle at 6, so that the legs 4 and 7 are substantially parallel.

Registering apertures 3' are provided in the legs 4 and 7, through which a bolt, screw 3 or other suitable attaching means is adapted to be inserted so as to engage the supporting wall 2, said screw preferably being threaded so as to receive a tightening nut 8 thereupon, whereby the legs 4 and 7 may be adjusted to vary the grip on the pipe held in the loop.

Prongs or teeth 9 are provided at the corners of the free end of the leg 4, as shown in the drawings, Figs. 1-4, said corners being arranged preferably diagonally of the meeting edges of the leg 4, so that said corners may be imbedded in the material of the wall 2 to prevent accidental rotation of the hanger about the axis of the screw or bolt 3 and afford a firmer fastening of the same. Where the wall 2 is of wood, plaster or other easily compressible material, the prongs 9 may be driven thereinto initially before tightening the nut 8, but in case the material of the wall 2 is of brick, concrete or the like, recessses may be initially provided therein to receive the prongs 9.

Prongs 10, preferably triangular in shape, as shown, may be, if desired, struck up from the body of the material of the leg 4, substantially adjacent the aperture 3' at a point inwardly of the end of said leg 4, said prong portions 10 being formed by slitting the metal and then bending the prong outwardly from the plane of said leg, said prong 10 extending in the same direction as the prongs 9.

Figure 2:
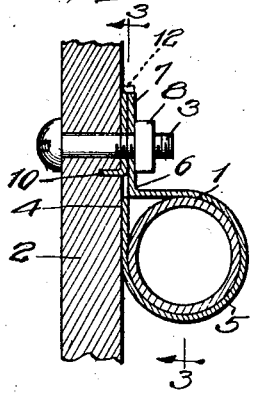
Fig. 2 is a section taken substantially on the line 2—2 of Fig. 1.
Figure 3:
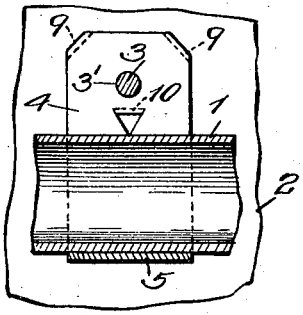
Fig. 3 is a section taken substantially on the line 3—3 of Fig. 2.
Figure 4:
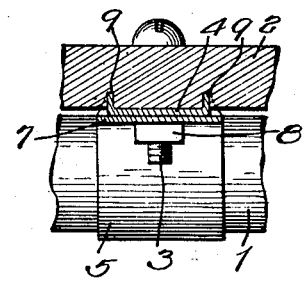
Fig. 4 is a section taken substantially on the line 4—4 of Fig. 1.

The free end of the leg 7 may be bent over, as at 12 in Fig. 2, so as to enclose the free end of the leg 4, thus aiding in registering the apertures 3' and preventing relative sliding of the legs 4 and 7.

Figure 5:
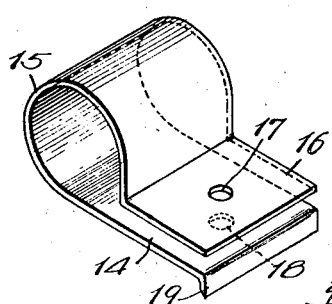
Fig. 5 is a perspective view showing a modified form of hanger.

In the modification shown in Fig. 5, the clamp comprises leg portions 14 and 16 connected by a loop 15, there being aligned apertures 17 and 18 through said leg portions. The leg 14 is laterally offset at its free end to form an elongated prong 19 along the entire edge, said prong being adapted to be imbedded in the material of the wall from which the hanger is to be supported.

Figure 6:
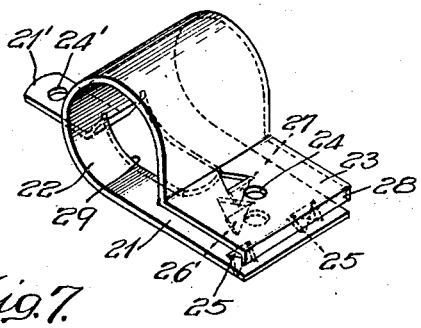
Fig. 6 is a perspective view showing another modification.
Figure 7:
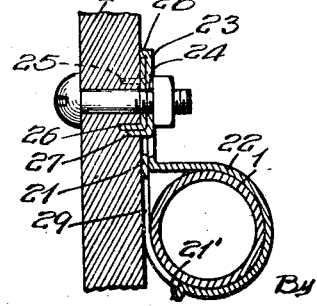
Fig. 7 is a cross section of the hanger shown in Fig. 6 in a position similar to that shown in Fig. 2.

In Figs. 6 and 7, the hanger comprises legs 21 and 23 connected by a loop 22, there being aligned apertures 24 through said legs to receive the bolt 3. Said leg 21 has prongs 25 formed therein in a manner similar to the prongs 10 in the previously described modification, said prongs being adapted to be imbedded in the material of the wall from which the hanger is to be supported.

Inwardly of the apertures 24 prong members 26 and 27 are formed upon the legs 21 and 23 respectively, the prong member 27 being adapted to extend through the slot formed from striking up the prong 26, as shown in Fig. 7, and to be superimposed on or overlie said prong 27 so as to be also imbedded in the material of which the wall 2 is composed. The free end of the leg 23 may be bent over as at 28, if desired, similar to the end 12 of the leg 7.

If desired, an additional leg 21' may be constructed by turning back a portion of one leg, as shown leg 21, by slitting or cutting the material as at 29, the free end being provided with an aperture 24' for a screw, bolt or the like. This makes the device particularly adapted for carrying heavy pipe or the like from a ceiling. I prefer to cut the same from a portion of the loop 22 as shown, to provide substantially a direct pull. Obviously the part 21', however, may be cut out and turned over from the loop 22 or leg 23. This feature is applicable to any of the other forms shown.

The prong or prongs at the free end of the parts 4, 14 or 21, if not entirely imbedded in the support, slightly cant the under leg, so that when the fastening means is tightened up, the looped end of the clamp is firmly held against the material or support, and the pipe or cable is at the same time more firmly gripped. There is to some extent in this case a resilient clamping action which at all times assures a tight firm hold on the support and in the pipe or other article supported.

It is to be understood that the hangers may be made of various sizes and of various kinds of material, and so finished as to harmonize with their supports or with the pipes or members carried thereby.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. A pipe clamp comprising a single piece of flat metal bent upon itself to form a pipe enclosing loop and a pair of resilient normally spaced legs adapted to be superimposed on one another, said legs having aligned apertures therethrough to receive a bolt whereby said clamp may be supported from a suitable cooperating member, prongs struck up from the leg adjacent said cooperating member so as to be adapted to forcibly enter the material thereof, said prongs being on opposite sides of said aperture, the other of said legs having a prong struck up from the body thereof so as to extend in the same direction as said first-mentioned prongs so as to be superimposed on one of said first-mentioned prongs and also entering the material of said supporting member.

2. A pipe clamp comprising a single piece of flat metal bent upon itself to form a pipe enclosing loop and a pair of resilient spaced legs, said legs having aligned apertures therethrough to receive a bolt whereby said clamp may be supported from a suitable cooperating member, prongs struck up from the leg adjacent said cooperating member, so as to be adapted to forcibly enter the material thereof, said prongs being on opposite sides of said aperture, the other of said legs having a prong struck up from the body thereof at the same distance from its free end as one of said first-mentioned prongs and extending in the same direction as said first-mentioned prong so as to be superimposed thereon to also enter the material of said supporting member, said second-mentioned leg having its free end bent so as to overlap the tip of the free end of the other of said legs.

3. A pipe clamp of a single piece of metal comprising a pair of legs adapted to be superimposed on one another and joined at one end to form a pipe-receiving loop, and a leg extending from said loop in a direction opposite to said first-mentioned legs and substantially in alignment therewith and adapted to receive a fastening means thereat.

4. A pipe clamp of a single piece of sheet metal comprising a pair of legs adapted to be superimposed on one another and joined at one end to form a pipe-receiving loop, a portion of said loop and of one of said legs being slit, and a leg formed from said slit portion and extending from said loop in a direction opposite to said first-mentioned pair of legs but substantially in alignment therewith and adapted to receive fastening means therethrough.

5. A pipe clamp comprising a single piece of metal bent upon itself to form a loop, and a pair of substantially parallel opposed resilient spaced legs having aligned apertures therethrough to receive a bolt whereby said clamp may be supported from a suitable cooperating member, prongs struck up from the leg adjacent said cooperating member so as to be adapted to forcibly enter the material thereof, and a prong struck up from the body of the other leg and extending in the same direction as said first-mentioned prongs so as to be superimposed on one of said first-mentioned prongs and also entering the material of said supporting member.

In testimony whereof, I have hereunto signed my name in the presence of two subscribing witnesses.

JOHN VRBA.

Witnesses:
Roy W. Hill,
Ruth M. Ephraim.